(12) United States Patent
Kobayashi et al.

(10) Patent No.: US 6,274,958 B1
(45) Date of Patent: *Aug. 14, 2001

(54) SPINDLE MOTOR

(75) Inventors: Yukihiro Kobayashi; Toshiaki Watanabe, both of Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,695

(22) Filed: Apr. 1, 1999

Related U.S. Application Data

(63) Continuation-in-part of application No. 08/854,821, filed on May 12, 1997, now abandoned.

(30) Foreign Application Priority Data

May 17, 1996 (JP) .................................................. 8-148060

(51) Int. Cl.[7] .............................. H02K 5/16; F16C 33/74
(52) U.S. Cl. ............................................ 310/90; 384/132
(58) Field of Search .................................. 310/67 R, 90; 384/107, 100, 129, 130, 132, 138, 189, 226, 607

(56) References Cited

U.S. PATENT DOCUMENTS

| | | | |
|---|---|---|---|
| 4,737,673 | | 4/1988 | Wrobel ..................................... 310/90 |
| 5,325,006 | * | 6/1994 | Uno et al. ............................... 310/90 |
| 5,396,134 | | 3/1995 | Mochizuki .......................... 310/67 R |
| 5,403,098 | * | 4/1995 | Yasui et al. ........................... 384/115 |
| 5,469,008 | * | 11/1995 | Nakajima et al. ................... 310/90.5 |
| 5,528,092 | * | 6/1996 | Ohta .................................... 310/67 R |
| 5,540,504 | * | 7/1996 | Cordova et al. ...................... 384/100 |
| 5,610,462 | * | 3/1997 | Takahashi ............................... 310/90 |
| 5,715,116 | | 2/1998 | Moritan et al. .................... 360/99.08 |
| 5,791,784 | * | 8/1998 | Ichiyama ............................... 384/107 |
| 5,822,846 | * | 10/1998 | Moritan et al. ......................... 29/598 |
| 5,883,455 | * | 3/1999 | Fukasawa et al. ...................... 310/91 |

* cited by examiner

Primary Examiner—Nestor Ramirez
Assistant Examiner—Dang Dinh Le
(74) Attorney, Agent, or Firm—Bell, Boyd & Lloyd LLC

(57) ABSTRACT

A spindle motor comprising: a stator portion which includes a stator board which is fixedly disposed, a plain bearing which is secured onto the stator board, and a wound coil disposed around the plain bearing; a rotor portion which includes a rotating shaft which is rotatably supported by the plain bearing, a rotor yoke which is integrally fixed to the rotating shaft, and a rotor magnet provided to the rotor yoke; and a plate which is provided on at least one end face of the plain bearing and adapted to prevent leakage of lubricating oil to the outside due to rotation of the rotor portion.

7 Claims, 3 Drawing Sheets

SPINDLE MOTOR

This is a Continuation-in-Part application of Ser. No. 08/854,821 filed on May 12, 1997 now abandoned which is incorporated herein.

BACKGROUND OF THE INVENTION

1. Field of the Invention

The present invention relates to a spindle motor which is used to rotate an optical disc such as a compact disc (CD), a CD-ROM or the like.

2. Description of the Prior Art

FIG. 1 is a side view showing a conventional type of spindle motor as described above. In FIG. 1, a spindle motor 1 comprises a stator portion 2 which is fixedly disposed, and a rotor portion 3 which is supported so as to be rotatable relatively to the stator portion 2.

The stator portion 2 includes a stator board 2a, a bearing holder 2b secured to the stator board 2a, a wound coil 2c which is fixedly disposed so as to surround the bearing holder 2b in the peripheral direction, and a bearing 2d which is held in the bearing holder 2b by press-fitting or the like. The bearing 2d is formed as an oil-impregnation plain (sliding) bearing by metal sintering, for example, and lubricating oil is impregnated in pores 2e (FIG. 2) which occur in the sintering process.

Further, the rotor portion 3 includes a rotating shaft 3a which is rotatably supported by a bearing 2d, a cylindrical rotor yoke 3b which is opened at the lower end thereof and fixed to the rotating shaft 3a so as to surround the wound coil 2c from the outside, a rotor magnet 3c disposed on the inner surface of the rotor yoke 3b, a substantially disc-shaped turn table 3d which is fixed in the neighborhood of the upper end of the rotating shaft 2. In this case, the lower portion of the rotating shaft 3a is supported by a thrust pad 4 in the bearing 2d, whereby the rotating shaft 3a is prevented from falling down.

According to the spindle motor 1 thus constructed, an optical disc (not shown) is disposed on the turn table 3d, and the magnetic field which is generated in the wound coil 2c by suitably supplying current to the wound coil 2c interacts with the magnetic field due to the rotor magnet 3c and the rotor yoke 3b of the rotor portion 3, whereby the rotor portion 3 is rotated. At this time, when following the rotation of the rotor portion 3, the rotating shaft 3a is rotated in the bearing 2d, the lubricating oil impregnated in the bearing 2d seeps into a slight gap between the rotating shaft 3a and the bearing 2d to form oil membrane between the rotating shaft 3a and the bearing 2d, so that the rotating shaft 3a is smoothly rotatable in the bearing 2d.

However, in the spindle motor 1 thus constructed, upon following the rotation of the rotating shaft 3a, the lubricating oil 2f seeping into the gap between the rotating shaft 3a and the bearing 2d may be moved along the rotor yoke 3b by a centrifugal force occurring due to the rotation of the rotating shaft 3a as indicated by an arrow A of FIG. 2, so that the lubricating oil is finally scattered to the outside. Therefore, the amount of the lubricating oil in the gap between the rotating shaft 3a and the bearing 2d is reduced, and thus an oil membrane which enables the smooth rotational motion of the rotating shaft 3a cannot be formed. In this case, there occurs a problem that the rotating shaft 3a is baked and bonded to the bearing 2d, so that the rotor portion 3 is not normally rotated and thus the lifetime of the spindle motor 1 is reduced.

SUMMARY OF THE INVENTION

In view of the foregoing problem, an object of the present invention is to provide a spindle motor which can prevent scattering of lubricating oil with a simple construction to greatly lengthen the lifetime of the spindle motor.

In order to attain the above object, according to a first aspect of the present invention, a spindle motor according to the present invention includes a stator portion having a plain bearing, a rotor portion which has a rotating shaft and is rotatably supported by said plain bearing, and a plate which is provided on at least one end face of the plain bearing and adapted to prevent leakage of lubricating oil to the outside due to rotation of the rotor portion.

In on order to attain the above object, according to a second aspect of the present invention, a spindle motor comprises: a stator portion including a stator board which is fixedly disposed, a plain bearing which is secured onto the stator board, and a wound coil disposed around the plain bearing; a rotor portion including a rotating shaft which is rotatably supported by the plain bearing, a rotor yoke which is integrally fixed to the rotating shaft, and a rotor magnet provided to the rotor yoke; and a plate which is provided on at least one end face of the plain bearing and adapted to prevent leakage of lubricating oil to the outside due to rotation of the rotor portion.

According to the spindle motor thus constructed, since at least one end face of the plain bearing is closed by the plate, the lubricating oil which seeps from the inside of the plain bearing into the gap between the rotating shaft and the plain bearing can be prevented from being scattered to the outside due to the rotation of the rotating shaft. Accordingly, the oil membrane can be surely formed between the plain bearing and the rotating shaft, so that the smooth rotational motion of the rotating shaft can be ensured. Therefore, the rotating shaft can be surely prevented from being baked and bonded to the plain bearing, so that the lifetime of the spindle motor can be remarkably lengthened.

Further, since the plain bearing is held in the hollow cylindrical bearing holder which is fixed to the stator board and also the scattering of the lubricating oil from both the end faces of the plain bearing is prevented when the plate for preventing the scattering of the lubricating oil is resigned so as to close the end face of the plain bearing in an area between the bearing holder and the rotating shaft, the lifetime of the spindle motor can be further lengthened.

DETAILED DESCRIPTION OF THE PREFERRED EMBODIMENTS

Preferred embodiments according to the present invention will be described hereunder with reference to FIGS. 3 to 5.

The following description relates to preferred embodiments according to the present invention, and various technically preferable limitations are added to these embodiments. However, the subject matter of the present invention is not limited to these embodiments insofar as there is not any description which particularly specifies or limits the present invention.

Figure 1:
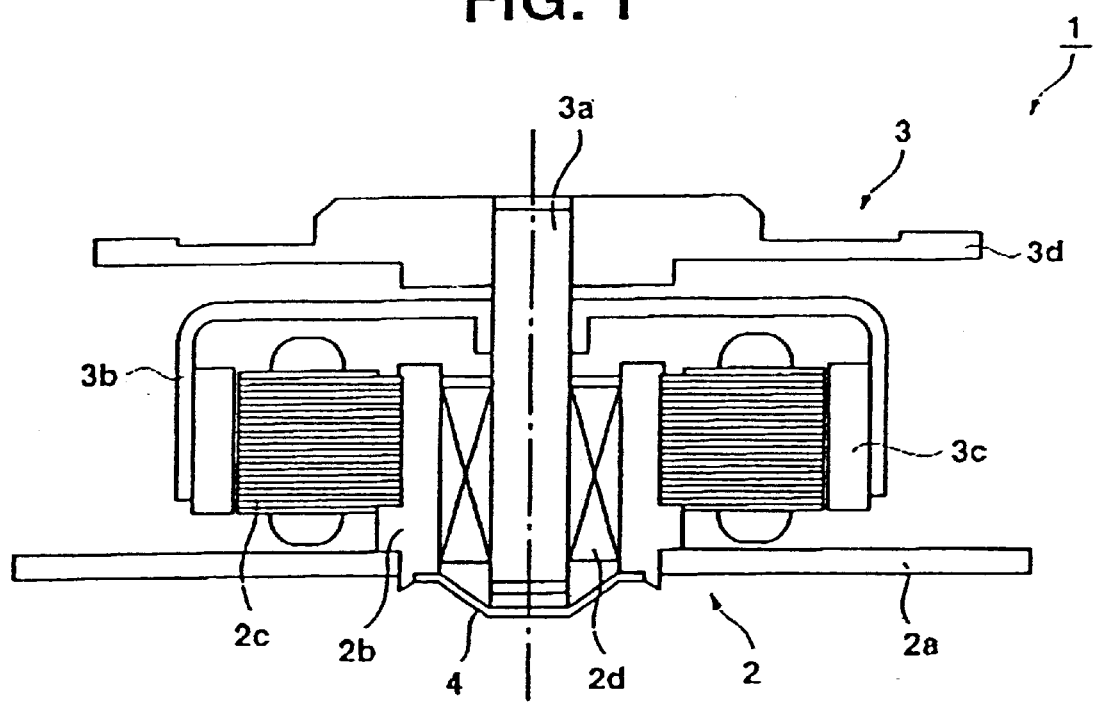
FIG. 1 is a schematic diagram shown a conventional spindle motor.
Figure 2:
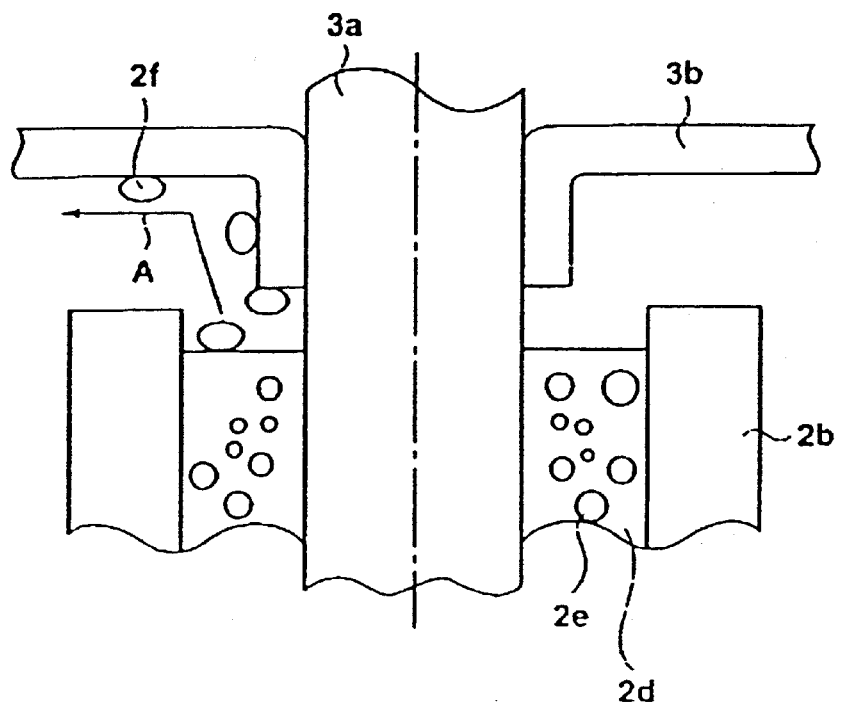
FIG. 2 is a partially enlarged cross-sectional view showing a main part of the spindle motor shown in FIG. 1.
Figure 3:
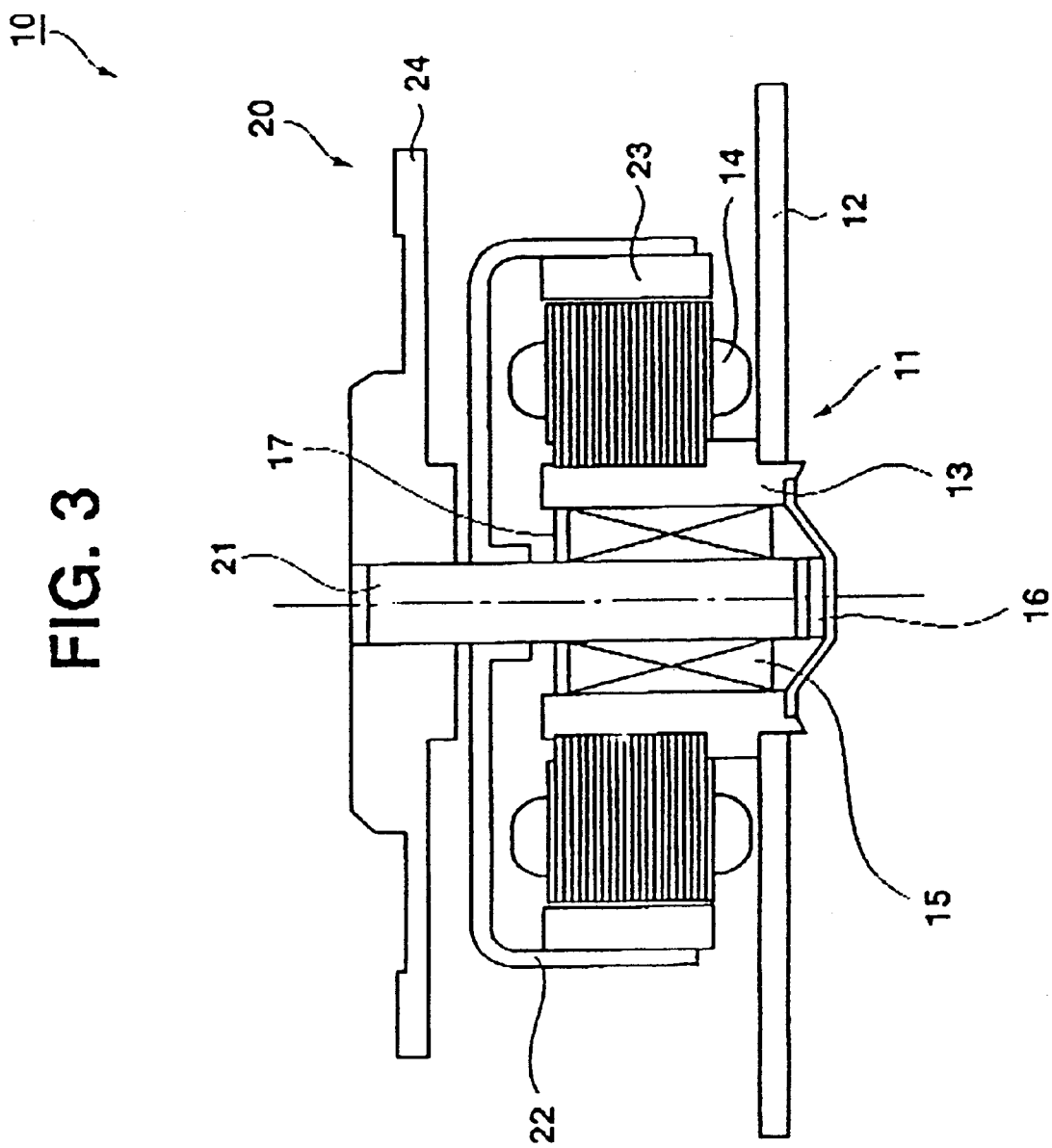
FIG. 3 is a schematic cross-sectional view showing a first embodiment of a spindle motor according to the present invention.
Figure 4:
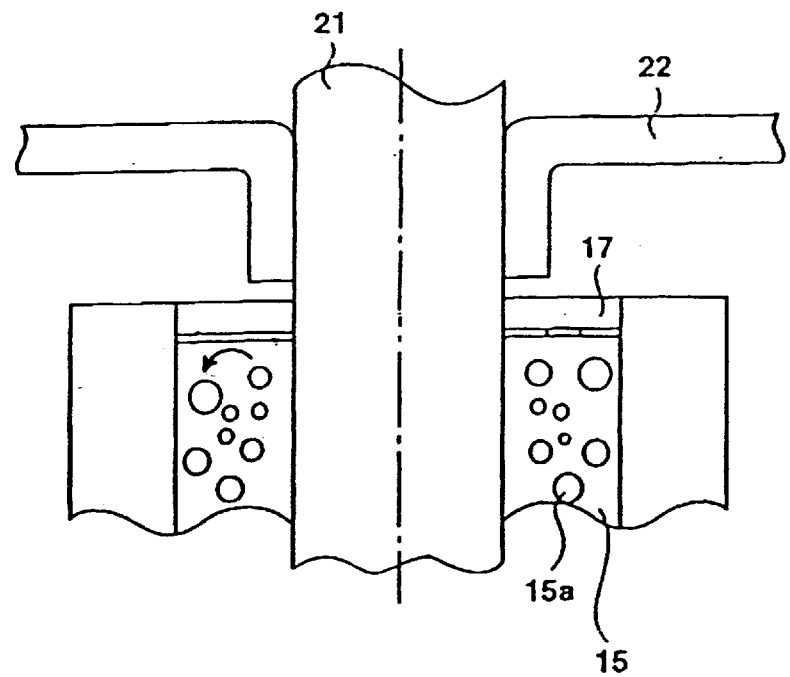
FIG. 4 is a partially enlarged cross-sectional view showing a main part of the spindle motor shown in FIG. 3.

FIG. 3 shows a first embodiment of a spindle motor according to the present invention.

In FIG. 3, a spindle motor 10 includes a stator portion 11 which is fixedly disposed, and a rotor portion 20 which is supported so as to be rotatable relatively to the stator portion 11.

The stator portion 11 includes a stator board 12, a bearing holder 13 secured to the stator board 12, a wound coil 14 which is fixedly disposed so as to surround the bearing holder 13 in the peripheral direction thereof, a plain (sliding) bearing 15 which is held in the bearing holder 13 by press-fitting or the like, and a thrust pad 16. The plain bearing 15 is formed by metal sintering, for example, and lubricating oil is impregnated in pores 15a which occur during the sintering process (see FIG. 4).

Further, the rotor portion 20 includes a rotating shaft 21 which is rotatably supported by the plain bearing 15, a cylindrical rotor yoke 22 which is opened at the lower end thereof and secured to the rotating shaft 21 so as to surround the wound coil 14 from the outside, a rotor magnet 23 provided on the inner surface of the rotor yoke 22, and a substantially disc-shaped turn table 24 which is secured in the vicinity of the upper end of the rotating shaft 21. In this case, the rotating shaft 21 is supported at the lower portion thereof by the thrust pad 16 in the plain bearing 15, whereby the rotating shaft can be prevented fro falling down.

In addition, in the spindle motor 10 of this embodiment, a substantially flat plate 17 for preventing scattering of lubricating oil is affixed to the end face at the upper side of the plain bearing 15. The plate 17 is preferably formed of a non-absorbent material such as resin, metal, ceramic, etc., wherein the plate 17 completely repels the lubricating oil so as to retain the lubricating oil within the plain bearing 15.

The spindle motor 10 of this embodiment is constructed as described above. When an optical disc (not shown) is mounted on the turn table 24 and current is suitably supplied to the wound coil 14, the magnetic field occurring in the wound coil 14 interacts with the magnetic field due to the rotor magnet 23 and the rotor yoke 22 of the rotor portion 20 to rotate the rotor portion 20.

At this time, following the rotation of the rotor portion 20, the rotating shaft 21 is rotated in the plain bearing 15, and the lubricating oil impregnated in the plain bearing 15 seeps into a slight gap between the rotating shaft 21 and the bearing 15 to form a lubricating membrane. Therefore, the rotating shaft 21 car smoothly rotate in the plain bearing 15.

Again, referring to FIG. 4, the plate 17 is provided on the upper end face of the plain bearing 15 as described above, and thus the lubricating oil seeping into the gap between the plain bearing 15 and the rotating shaft 21 is interrupted from the outside by the plate 17. Therefore, the lubricating oil in the gap is prevented from being scattered to the outside due to the rotation of the rotating shaft 21, and rather it is kept in the gap. Accordingly, the oil membrane is surely formed between the rotating shaft 21 and the plain bearing 15, resulting in great increase of the lifetime of the spindle motor 10.

Figure 5:
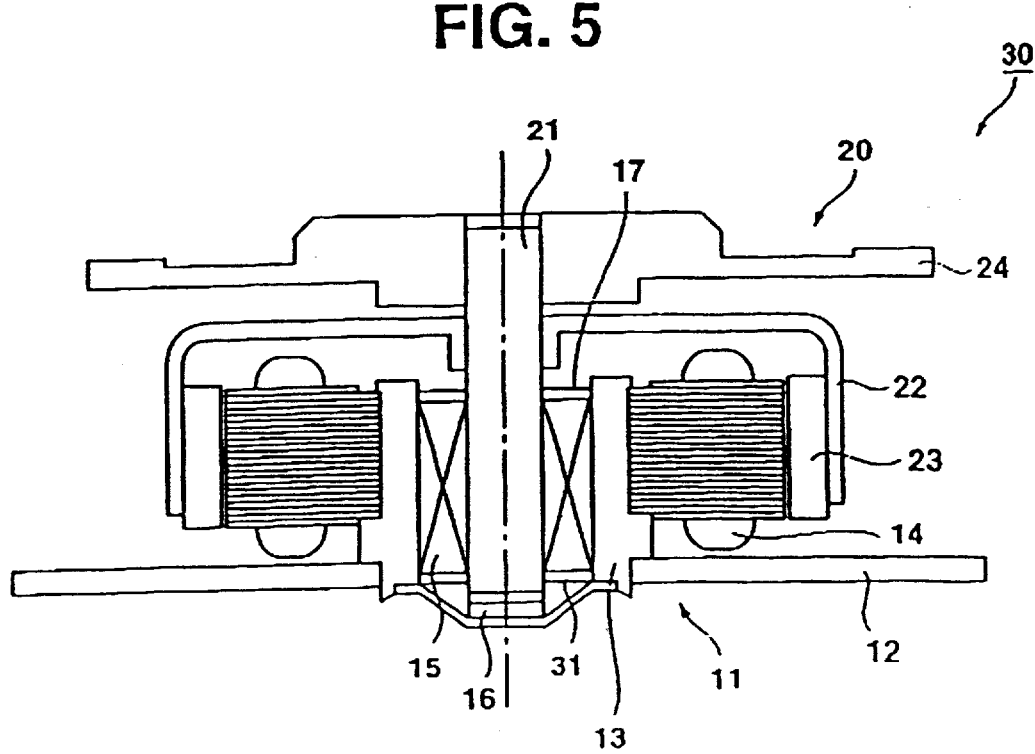
FIG. 5 is a schematic cross-sectional view showing a second embodiment of the spindle motor according to the present invention.

FIG. 5 shows a second embodiment of the spindle motor according to the present invention.

In FIG. 5, a spindle motor 30 is designed in the substantially same construction as the spindle motor 10 shown in FIG. 3, and it is different from the spindle motor 10 only in that a plate for preventing scattering of lubricating oil is also provided on the end face at the lower side of the plain bearing 15.

According to the spindle motor 30 thus constructed it has the same action as the spindle motor 10 shown in FIG. 3, and both the upper and lower end faces of the plain bearing 15 are closed by the plates 17 and 31, respectively. Therefore, the lubricating oil which seeps from the plain bearing 15 into the gap between the rotating shaft 21 and the plain bearing 15 due to the rotation of the rotating shaft 21, is interrupted from the outside at the upper and lower sides of the plain bearing 15. Accordingly, the scattering of the lubricating oil from the gap to the outside due to the rotation of the rotating shaft 21 can be surely prevented. Consequently, the oil membrane can be surely formed between the rotating shaft 21 and the plain bearing 15, so that the lifetime of the spindle motor 10 can be increased more still.

In the above-described embodiments, the spindle motor is provided with a magnet at the rotational side, that is, the rotor side. However, the present invention is not limited to these embodiments, and the present invention is applicable to any spindle motor having an oil-impregnated bearing even when the coil is provided at the rotor side.

Further, in the above-described embodiments, the rotor yoke 22 and the rotor magnet disposed on the inner surface of the rotor yoke 22 are arranged so as to surround from the outside the wound coil 14 which is disposed in a ring shape. The present invention is not limited to this arrangement, and the present invention is applicable to a spindle motor in which a rotor yoke and a rotor magnet are arranged so as to confront the wound coil in the axial direction.

Still further, each of the above-described embodiments relates to a spindle motor for rotating an optical disc. However, the present invention is not limited to this type of spindle motor, and the present invention is applicable to any other type spindle motor for rotating any other rotary member.

As described above, according to the present invention, there can be provided a spindle motor whose lifetime can be remarkably lengthened by preventing the scattering of the lubricating oil.

What is claimed is:

1. A spindle motor comprising:
   a stator portion having an oil-impregnated plain bearing;
   a rotor portion which has a rotating shaft and is rotatably supported by the oil-impregnated plain bearing, wherein lubricating oil from the oil-impregnated plain bearing seeps out to form a lubricating membrane in a gap between the oil-impregnated plain bearing and the rotating shaft; and
   a substantially flat plate affixed to an entire surface of at least one end face of the oil-impregnated plain bearing and adapted to prevent leakage of the lubricating oil outside of the gap due to rotation of the rotor portion, the substantially flat plate formed of a non-absorbent material wherein the substantially flat plate completely repels the lubricating oil such that the lubricating oil is maintained entirely within the oil-impregnated plain bearing and the gap.

2. The spindle motor of claim 1, wherein the non-absorbent material is at least one of resin, metal, and ceramic.

3. The spindle motor of claim 1, wherein the substantially flat plate is a first substantially flat plate affixed to the entire surface of a first end face of the oil-impregnated plain bearing, the spindle motor further comprising:

a second substantially flat plate affixed to an entire surface of a second end face of the oil-impregnated plain bearing.

4. A spindle motor comprising:

a stator portion including a stator board which is fixedly disposed, an oil-impregnated plain bearing which is secured onto the stator board, and a wound coil disposed around the oil-impregnated plain bearing;

a rotor portion including a rotating shaft which is rotatably supported by the oil-impregnated plain bearing, a rotor yoke which is integrally fixed to the rotating shaft, and a rotor magnet provided to the rotor yoke, wherein lubricating oil from the oil-impregnated plain bearing seeps out to form a lubricating membrane in a gap between the oil-impregnated plain bearing and the rotating shaft; and a substantially flat plate affixed to an entire surface of at least one end face of the oil-impregnated plain bearing and adapted to prevent leakage of the lubricating oil outside of the gap due to rotation of the rotor portion, the substantially flat plate formed of a non-absorbent material wherein the substantially flat plate completely repels the lubricating oil such that the lubricating oil is maintained entirely within the oil-impregnated plain bearing and the gap.

5. The spindle motor of claim 4, wherein the oil-impregnated plain bearing is held in a hollow cylinder bearing holder which is fixed to the stator board, and the plate for preventing the scattering of the lubricating oil is designed so as to close the end face of the oil-impregnated plain bearing in an area between the bearing holder and the rotating shaft.

6. The spindle motor of claim 4, wherein the non-absorbent material is at least one of resin, metal, and ceramic.

7. The spindle motor of claim 4, wherein the substantially flat plate is a first substantially flat plate affixed to the entire surface of a first end face of the oil-impregnated plain bearing, the spindle motor further comprising:

a second substantially flat plate affixed to an entire surface of a second end face of the oil-impregnated plain bearing.

* * * * *